May 23, 1944.  E. J. DE NORMANVILLE  2,349,410
VARIABLE SPEED EPICYCLIC GEARING
Filed April 26, 1943
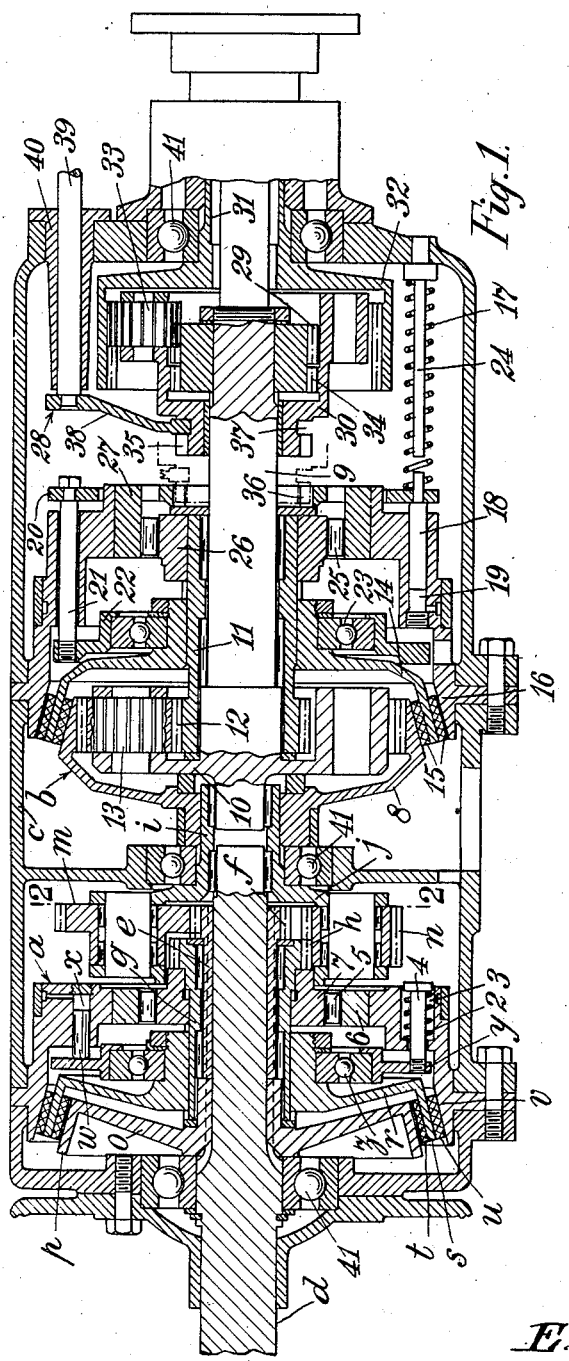
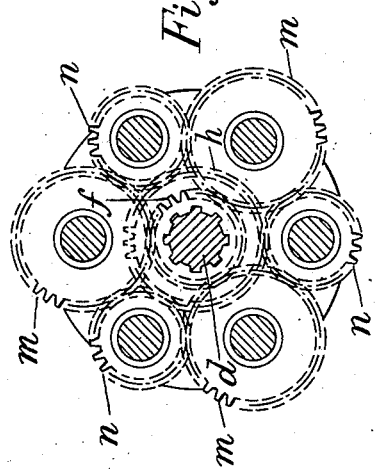
Inventor
E. J. de Normanville
By Glascock Downing & Seidel
Attys.

Patented May 23, 1944

2,349,410

UNITED STATES PATENT OFFICE 2,349,410

VARIABLE SPEED EPICYCLIC GEARING

Edgar Joseph de Normanville,
Hatch End, England

Application April 26, 1943, Serial No. 484,622
In Great Britain June 5, 1942

1 Claim. (Cl. 74—290)

This invention has for its object to provide an improved variable speed epicyclic mechanism for use in the power transmission system of a motor vehicle and for other analogous purposes.

The invention comprises a variable speed epicyclic "underdrive" mechanism having in combination a driving sun pinion, a controlling sun pinion, a driven planet pinion carrier, interengaging planet pinions mounted on the carrier and engaging the sun pinions, a unidirectional locking device for preventing rotation of the controlling sun pinion in one direction and thereby varying the speed ratio between the driving and driven members, controllable friction means for preventing relative rotation of the driving and controlling sun pinions to provide a direct drive connection between the driving sun pinion and the driven planet carrier, a stationary member, and additional friction means for interconnecting the controlling sun pinion and the stationary member when the unidirectional locking device is in action.

By the above-mentioned term "underdrive" is meant a mechanism in which the driven member can be rotated at a speed equal to or less than that of the driving member.

In the accompanying drawing—

Figure 1 is a sectional elevation of a variable speed epicyclic gearing constructed in accordance with the invention for use on a motor vehicle.

Figure 2 is a section on the line 2—2 of Figure 1.

In carrying the invention into effect as shown, I mount the two "underdrive" mechanisms $a$, $b$ coaxially in a stationary casing $c$.

The first mechanism $a$ comprises a driving shaft $d$ to which motion can be imparted through a fluid fly wheel and a clutch, and on which is secured a sleeve $e$ having formed or secured on one of its ends the driving sun pinion $f$. On the sleeve $e$ is mounted another sleeve $g$, and on the end of the latter sleeve adjacent to the driving sun pinion $f$ is formed or secured the controlling sun pinion $h$, the two sleeves being relatively rotatable. Also on the end of the driving shaft $d$ adjacent to the driving sun pinion $f$ is mounted another sleeve $i$ which serves as the driven member of the mechanism, this sleeve being formed on or secured to a planet pinion carrier $j$. On the carrier $j$ are mounted pairs of interengaging planet pinions $m$, $n$. The pinion $m$ of each pair also engages the driving sun pinion $f$, and the other pinion $n$ of each pair engages the controlling sun pinion $h$.

The driving sun pinion $f$ may be of equal, greater, or less diameter than the controlling sun pinion $h$, the ratio of the diameters being appropriate to the speed ratio required between the driving and driven members $d$, $i$, and the planet pinions $m$, $n$, of each pair are of corresponding diameters.

For the control of the mechanism $a$, there is secured on the driving shaft $d$, at the end of the sleeve $e$ remote from the driving sun pinion $f$, a member $o$ in the form of a disc having a conical peripheral flange $p$. Also there is slidably splined on the sleeve $g$ of the controlling sun pinion $h$ another member $r$ in the form of a disc having a conical peripheral flange $s$. This latter flange $s$ surrounds, and is provided on its inner peripheral surface with friction material $t$ adapted to engage the outer peripheral surface of the flange $p$ on the member $o$, this member and the member $r$ forming parts of a friction clutch. Further the outer peripheral surface of the flange $s$ on the member $r$ is provided with friction material $u$ adapted to engage a complementary surface on a stationary member $v$ secured to or forming part of the casing $c$. When the member $r$ is slid into engagement with the first clutch member $o$, the two sun pinions $f$, $h$, are locked together, causing the driven sleeve $i$ to be rotated at the same speed as the driving shaft $d$. When the member $r$ is slid into engagement with the stationary member $v$, the controlling sun pinion $h$ is held against rotation in the manner hereinafter described, and the driven sleeve $i$ is then rotated at a lower speed than the driving shaft $d$, the ratio of these speeds being dependent on the relative diameters of the sun pinions $f$, $h$.

For moving the slidable member $r$ in one direction, the stationary member $v$ is provided with a plurality of fluid operated plungers as $w$ slidable in cylindrical bores as $x$ in the said member, the outer ends of the plungers being arranged to abut on a ring $y$ which is supported on the slidable member by a ball or other bearing $z$, and any convenient means being provided for admitting fluid under pressure to the said bores. For moving the slidable member $r$ in the opposite direction springs 2 are used. These springs are arranged in bores 3 formed in the stationary member $v$ between those accommodating the plungers $w$, the springs being arranged to act on stems 4 extending laterally from and secured to the ring $y$. The springs 2 serve to hold the slidable member $r$ in engagement with the stationary member $v$, and the plungers $w$ serve to hold the slidable member in engagement with the complementary clutch member o on the driving shaft d.

In addition there is arranged between the controlling sun pinion sleeve g and the stationary member v a unidirectional locking device of any convenient construction. This may comprise an annular arrangement of rollers 5 arranged to cooperate with the internal peripheral surface of an annular part 6 secured to or formed on the stationary member v and with inclined surfaces forming the bases of recesses in the outer periphery of another annular part 7 secured to or formed on the sleeve g. The locking device 5—7 is such that it can hold the controlling sun pinion h against rotation in the opposite direction to the driving shaft d when the controlling sun pinion is released from the driving sun pinion f by the slidable friction member r, and allow both sun pinions to rotate together when they are interlocked by the friction clutch members o, s. The purpose of the unidirectional locking device 5—7 is to take the main part if not the whole of the reaction of the controlling sun pinion h when the latter is required to be held stationary, thus relieving the friction members s, v of that duty when power is being transmitted through the mechanism from the driving shaft d. When, however, the reverse condition temporarily obtains, that is to say when power is transmitted from the driven member i to the driving shaft d as a result, for example, of the vehicle driving the engine during the descent of an incline, the holding of the controlling sun pinion h is effected solely by the friction members s, v.

The second mechanism b is essentially similar to that described in my specification of British Letters Patent No. 477,530. This mechanism comprises an internally toothed driving annulus 8 formed on or secured to the driven member i above described, a driven shaft 9 arranged coaxially with and supported at one end within the said driven member, a planet pinion carrier 10 formed or secured on the driven shaft, a sleeve 11 rotatably mounted on the driven shaft, a sun pinion 12 formed on or secured to the sleeve, and planet pinions as 13 mounted on the carrier and serving to interconnect the sun pinion and annulus. Slidably splined on the sleeve 11 is a friction member 14 having a conical peripheral portion provided with friction material 15 through which the slidable member can engage either a conical surface on the outer periphery of the annulus 8 or a conical surface on a stationary member 16 secured to or forming part of the casing c. The slidable member 14 is movable in the direction for engaging the annulus 8 by springs as 17, and in the opposite direction for engaging the stationary member 16 by fluid operated plungers as 18 mounted in bores as 19 in the said stationary member, any convenient means (not shown) being provided for admitting fluid under pressure to the said bores. The springs as 17 and plungers 18 are arranged to act on opposite sides of a ring 20 which is connected by rods as 21, passing through additional bores in the stationary member 16, to another ring 22, the latter being supported by the slidable member 14 through the medium of a ball or other bearing 23. Movement of the slidable member 14 by the plungers 18 is limited by fixed stops as 24 against which the adjacent ends of the plungers can abut, these ends of the plungers being reduced and arranged to extend through the ring 20, and the springs 17 being situated around the stops and the adjacent ends of the plungers. Between the stationary member 16 and the sleeve 11 of the sun pinion 12 is arranged a unidirectional locking device of any convenient form whereby the sun pinion 12 is held against rotation in the opposite direction to the annulus 8 when the member 14 is released from the annulus. This unidirectional locking device may comprise an annular arrangement of rollers 25 adapted to cooperate with appropriately shaped peripheries of annular parts 26, 27, on the sleeve 11 and the stationary member 16 respectively. The purpose of the unidirectional locking device 25—27 is similar to that of the unidirectional locking device employed in the first mechanism a.

When the sun pinion 12 is locked to the annulus 8 by the friction member 14, the driven shaft 9 is rotated at the same speed as the annulus 8, and when the sun pinion is held stationary, the driven shaft is rotated at a lower speed appropriate to the ratios of the diameters of the sun pinion and annulus.

If desired a reversing gear of any convenient form may be provided at the rear end of the second mechanism b. In the example shown such a gear is indicated as a whole by 28, and comprises a sun pinion 29 secured on the driven shaft 9, a planet pinion carrier 30 rotatably and slidably mounted on the driven shaft between the sun pinion 29 and the stationary member 16, a hollow driven shaft 31 arranged coaxially with and serving to support the outer end of the driven shaft 9, an internally toothed annulus 32 formed or secured on the hollow driven shaft, and pinions as 33 mounted on the carrier and engaging the sun pinion and annulus. The planet pinion carrier 30 is made to a hollow form and is provided internally with teeth 34 adapted to engage the sun pinion 29, the latter being made sufficiently wide to engage both these teeth and those of the planet pinions 33 when the carrier is in the extreme position shown in full lines in Figure 1. Also the carrier 30 is provided at its end adjacent to the stationary member 16 with external teeth 35 adapted to engage internal teeth 36 on the part 27 of the stationary member when the carrier is moved to the other extreme position shown in broken lines in Figure 1. In this position of the carrier 30 its internal teeth 34 are disengaged from the sun pinion 29 which, however, is still in engagement with the planet pinions 33. At a position adjacent to the external teeth 35 the carrier 30 is formed with a groove 37 which is engaged by a fork 38 whereby the carrier can be moved between its two extreme positions, the fork having secured to it an actuating rod 39 which extends through and is slidably supported by a bearing 40 in the adjacent end of the casing c.

When the carrier 30 is in the position shown in full lines the hollow driven shaft 31 rotates at the same speed and in the same direction as the driven shaft 9, but when the carrier is in the position shown in broken lines the shaft 31 rotates at a slower speed than and in the opposite direction to the shaft 9.

For supporting the three mechanisms a, b and 28 within the casing c, any convenient arrangement of ball or other bearings is provided, three such bearings being employed in the example shown, and being indicated by 41.

Instead of being arranged as above described the series order of the mechanisms a, b may be reversed in which case the driving member d of mechanism $a$ may be connected to the driven member 10 of the mechanism $b$.

By the above described invention I am able to provide four convenient speed ratios in a manner which allows a change to be made from any ratio to another smoothly and without either declutching the mechanism from the engine or acceleration or deceleration of the engine speed. Whilst the invention is primarily intended for use on motor vehicles it may (with appropriate modification of subordinate details) be applied to other analogous purposes.

Having thus described my invention what I claim as new and desire to secure by Letters Patent is:

A variable speed epicyclic "underdrive" mechanism having in combination a driving sun pinion, controlling sun pinion, a driven planet pinion carrier, interengaging planet pinions mounted on the carrier and engaging the sun pinions, a unidirectional locking device for preventing rotation of the controlling sun pinion in one direction and thereby varying the speed ratio between the driving and driven members, controllable friction means for preventing relative rotation of the driving and controlling sun pinions to provide a direct drive connection between the driving sun pinion and the driven planet carrier, a stationary member, and additional friction means for interconnecting the controlling sun pinion and the stationary member when the unidirectional locking device is in action.

EDGAR JOSEPH DE NORMANVILLE.